(12) United States Patent
Sommers et al.

(10) Patent No.: US 12,021,707 B1
(45) Date of Patent: Jun. 25, 2024

(54) METHODS, SYSTEMS AND COMPUTER READABLE MEDIA FOR TESTING LINK ALLOCATION (LA) IMPLEMENTATIONS

(71) Applicant: Keysight Technologies, Inc., Santa Rosa, CA (US)

(72) Inventors: Christian Paul Sommers, Bangor, CA (US); Kingshuk Mandal, Kolkata (IN)

(73) Assignee: KEYSIGHT TECHOLOGIES, INC., Santa Rosa, CA (US)

( * ) Notice: Subject to any disclaimer, the term of this patent is extended or adjusted under 35 U.S.C. 154(b) by 0 days.

(21) Appl. No.: 18/122,196

(22) Filed: Mar. 16, 2023

Related U.S. Application Data (60) Provisional application No. 63/441,674, filed on Jan. 27, 2023.

(51) Int. Cl.
  *G06F 15/173* (2006.01)
  *H04L 41/12* (2022.01)
  *H04L 41/14* (2022.01)
  *H04L 43/50* (2022.01)

(52) U.S. Cl.
  CPC .............. *H04L 41/14* (2013.01); *H04L 41/12* (2013.01); *H04L 43/50* (2013.01)

(58) Field of Classification Search
  CPC .......... H04L 41/14; H04L 41/12; H04L 43/50
  See application file for complete search history.

(56) References Cited

U.S. PATENT DOCUMENTS

| | | | |
|---|---|---|---|
| 9,537,785 B2 | 1/2017 | Bergeron | |
| 10,243,781 B1* | 3/2019 | Kalburgi | ................. H04L 45/22 |
| 10,505,804 B2 | 12/2019 | Durgin et al. | |
| 2007/0195795 A1 | 8/2007 | Arai et al. | |
| 2008/0291826 A1 | 11/2008 | Licardie et al. | |
| 2014/0258524 A1 | 9/2014 | Thyni et al. | |
| 2015/0023147 A1 | 1/2015 | Lee et al. | |
| 2015/0156127 A1 | 6/2015 | Bello et al. | |
| 2016/0050156 A1 | 2/2016 | Bergeron | |
| 2020/0021510 A1* | 1/2020 | Gintis | ..................... H04L 43/50 |
| 2022/0345392 A1 | 10/2022 | Gajjala et al. | |

OTHER PUBLICATIONS

Notice of Allowance and Fee(s) Due and Examiner-Initiated Interview Summary for U.S. Appl. No. 14/460,340 (dated Aug. 26, 2016).

Applicant-Initiated Interview Summary for U.S. Appl. No. 14/460,340 (dated Jun. 17, 2016).

(Continued)

*Primary Examiner* — Padma Mundur (57) ABSTRACT

A method for testing a link allocation (LA) implementation, the method comprising: at a test system for testing a system under test (SUT): determining at least one LA implementation parameter usable for modifying an LA implementation of the SUT; generating a test session plan for testing the SUT, wherein generating the test session plan includes determining a first plurality of test values for the at least one LA implementation parameter; and initiating, using the test session plan, a test session involving the SUT, wherein, during the test session, the test system causes the SUT to modify the LA implementation using at least one of the first plurality of test values.

20 Claims, 8 Drawing Sheets

(56) References Cited

OTHER PUBLICATIONS

Non-Final Office Action for U.S. Appl. No. 14/460,340 (dated Mar. 21, 2016).

Krishnan, "Flow-aware Real-time SDN Analytics (FRSA)," http://blog.sflow.com/2014/02/flow-aware-real-time-sdn-analytics-frsa.html, pp. 1-12 (Feb. 5, 2014).

"Standard SAI PTF tests for ASIC hardware hashing" Github, https://github.com/opencomputeproject/SAI/blob/master/ptf/saihash.py, 2022.

Mandal, "Validating Equal-Cost Multi-Path (ECMP) at Scale", Keysight Blogs, pp. 1-6 (2020).

Zhang, et al., "Hashing Linearity Enables Relative Path Control in Data Centers", usenix, pp. 1-16 (2021).

Huawei, "What Is Hash Polarization?", https://support.huawei.com/enterprise/en/doc/EDOC1000091883/ca7a536/what-is-hash-polarization, 2023.

"Fine-grained" ECMP HLD (High-level design spec) for SAI (to effect resilient hashing) Github, https://github.com/opencomputeproject/SAI/blob/master/doc/ECMP/Ordered_and_Fine_Grained_ECMP.md, 2020.

"Policy based hashing HLD for SAI" Github, https://github.com/opencomputeproject/SAI/blob/master/doc/Hash/Policy-based-hash.md, 2020.

"SAI header files describing an actual programmatic API to control fine-grained hashing" Github, https://github.com/opencomputeproject/SAI/blob/master/inc/saihash.h, 2021.

"SAI Switch-level hashing mode APIs" Github, https://github.com/opencomputeproject/SAI/blob/c66602ea20bb32f3294aad3ade5a9449a1b2f307/inc/saiswitch.h#L88, 2022.

\* cited by examiner

METHODS, SYSTEMS AND COMPUTER READABLE MEDIA FOR TESTING LINK ALLOCATION (LA) IMPLEMENTATIONS

PRIORITY CLAIM

This application claims the priority benefit of U.S. Provisional Patent Application Ser. No. 63/441,674, filed Jan. 27, 2023, the disclosure of which is incorporated herein by reference in its entirety.

TECHNICAL FIELD

The subject matter described herein relates to testing involving network equipment. More particularly, the subject matter described herein relates to methods, systems, and computer readable media for testing link allocation (LA) implementations.

BACKGROUND

Network nodes, such as network switches or packet forwarding devices, may be configured to perform link allocation (LA), e.g., a routing or forwarding technique for sending packets via different paths or links to a destination. Various LA techniques and related protocols exist. For example, a network switch may implement equal cost multipath (ECMP), which is a network routing technique that enables related packets (e.g., traffic with the same destination IP address and/or source IP address) to traverse multiple paths at an equal cost. In another example, an LA technique may involve load balancing or load sharing traffic flows among different links to reach a same destination. While ECMP or other LA strategies can improve network utilization and user experience, manufacturers may utilize different implementations of ECMP or other LA strategies. Depending upon the LA implementations' performances, some implementations may be more or less desirable in certain situations. As such, network operators may benefit from understanding the impact (e.g., on network environment or user experience) and/or performance of different implementations.

Accordingly, it may be beneficial to test and analyze LA implementations of various network nodes, network cards, or equipment for insights and/or other reasons (e.g., prior to deployment).

SUMMARY

The subject matter described herein includes methods, systems, and computer readable media for testing link allocation (LA) implementations. A method for testing an LA implementation includes at a test system for testing a system under test (SUT): determining at least one LA implementation parameter usable for modifying an LA implementation of the SUT; generating a test session plan for testing the SUT, wherein generating the test session plan includes determining a first plurality of test values for the at least one LA implementation parameter; and initiating, using the test session plan, a test session involving the SUT, wherein, during the test session, the test system causes the SUT to modify the LA implementation using at least one of the first plurality of test values.

A system for testing an LA implementation includes at least one processor, a memory and a test system, implemented using the at least one processor and the memory, for testing a SUT, where the test system is configured for: determining at least one LA implementation parameter usable for modifying an LA implementation of the SUT; generating a test session plan for testing the SUT, wherein generating the test session plan includes determining a first plurality of test values for the at least one LA implementation parameter; and initiating, using the test session plan, a test session involving the SUT, wherein, during the test session, the test system causes the SUT to modify the LA implementation using at least one of the first plurality of test values.

The subject matter described herein may be implemented in software in combination with hardware and/or firmware. For example, the subject matter described herein may be implemented in software executed by a processor. In one example implementation, the subject matter described herein may be implemented using a computer readable medium having stored thereon computer executable instructions that when executed by the processor of a computer control the computer to perform steps. Example computer readable media suitable for implementing the subject matter described herein include non-transitory devices, such as disk memory devices, chip memory devices, programmable logic devices, and application-specific integrated circuits. In addition, a computer readable medium that implements the subject matter described herein may be located on a single device or computing platform or may be distributed across multiple devices or computing platforms.

As used herein, the term "LA implementation" refers to a routing or packet forwarding technique for sharing, balancing, splitting, or otherwise dividing traffic (e.g., packets or flows) among two or more links, paths, or devices and may be implemented using hardware, firmware, or software in combination with hardware and/or firmware.

As used herein, the term "node" refers to a physical node (e.g., at least one computing platform including one or more processors and memory) or a virtual node (e.g., a virtual machine (VM) or container running on a computing platform including one or more processors and memory).

As used herein, each of the terms "function", "engine", and "module" refers to hardware, firmware, or software in combination with hardware and/or firmware for implementing features described herein.

BRIEF DESCRIPTION OF THE DRAWINGS

Embodiments of the subject matter described herein will now be explained with reference to the accompanying drawings, wherein like reference numerals represent like parts, of which.

DETAILED DESCRIPTION

The subject matter described herein includes methods, systems, and computer readable media for testing link allocation (LA) implementations. LA implementations, e.g., an equal-cost multipath (ECMP) routing implementation and a link aggregation group (LAG) routing implementation, may employ similar techniques to distribute traffic across multiple physical links or paths. For example, ECMP and LAG implementations may use hash algorithms to divide or split traffic flows among available paths, e.g., by hashing packet header parameter values into hash buckets (e.g., ranges of hash output values) that are associated with unique links or paths. Since LA algorithms, e.g., hardware-based or software-based ECMP implementations, may employ vendor-specific techniques, it can be useful for network operators and others to understand their similarities and differences through realistic and comprehensive testing. While system-level testing methodologies may exist for testing ECMP behavior, such methodologies may treat the system under test as a black box and may not perform any fine-grained performance characterization of the ECMP implementation or the underlying hardware.

In accordance with some aspects of the subject matter described herein, techniques, methods, or mechanisms are disclosed for testing link allocation (LA) implementations. For example, a test system in accordance with various aspects described herein may generate and execute a test session involving an LA implementation executing on a system under test (SUT), e.g., a switching application-specific integrated circuit (ASIC) running switch abstraction interface (SAI)-based switching software and a network operating system (NOS), e.g., a software for open networking in the cloud (SONiC) NOS. In this example, the test system or a related entity (e.g., a test controller) may query a data store or a SUT for relevant parameters (e.g., configurable settings or aspects) of an LA implementation to test. In this example, the test system or a related entity (e.g., a test controller) may generate a test session plan for testing different configurations of the LA implementation including using appropriate test traffic (e.g., relevant test traffic patterns or multiple traffic flows with different packet header parameter values appropriate for testing aspects of an LA implementation or configurations thereof). Continuing with this example, the test system or a related entity (e.g., a test controller) may implement the test session plan by configuring test agents and the SUT before, during, or after portions of the test session are executed.

Advantageously, in accordance with some aspects of the subject matter described herein, configurable LA implementation parameters for an LA implementation may be determined and test session plans or definitions can be generated for testing various configurations or aspects of the LA implementation. Further, utilizing a configuration API or another mechanism or technique, an LA implementation executing on or at a system under test may be modified during a test session, thereby allowing a test system to test and characterize or understand an LA implementation or configurations thereof. For example, by utilizing a test system that can (re)configure parameters of an LA implementation, a test operator can test and analyze the LA implementation in different configurations (e.g., operating setting or parameter values) and can compare these performances to other LA implementations, e.g., using historical or predetermined data.

Reference will now be made in detail to various embodiments of the subject matter described herein, examples of which are illustrated in the accompanying drawings. Wherever possible, the same reference numbers will be used throughout the drawings to refer to the same or like parts.

Figure 1:
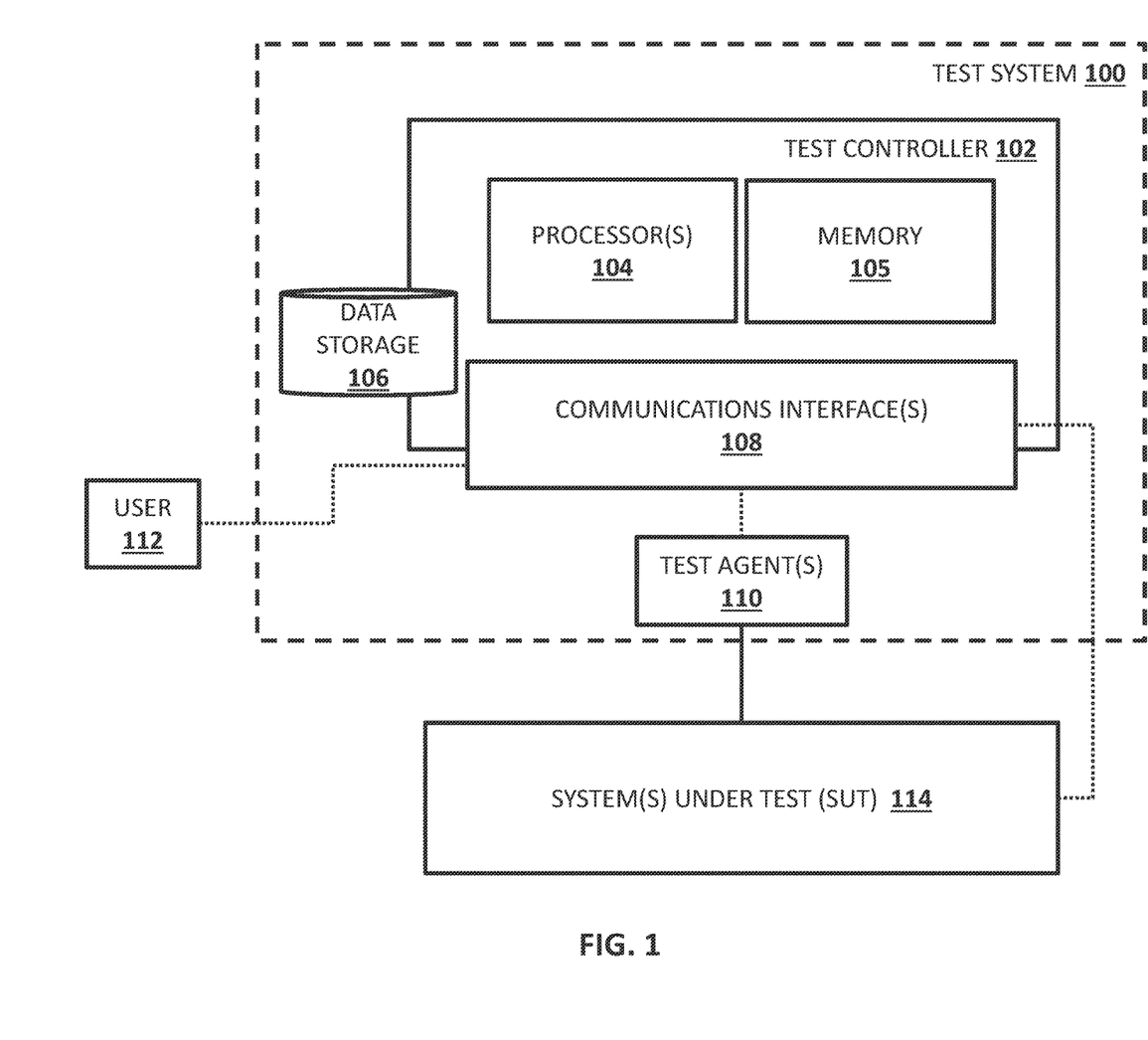
FIG. 1 is a block diagram illustrating an example test system for testing link allocation (LA) implementations.

FIG. 1 is a block diagram illustrating an example test system 100 for testing LA implementations (e.g., an ECMP or LAG routing implementation). Referring to FIG. 1, test system 100 may represent any suitable entity or entities (e.g., one or more testing platforms, nodes, or devices) associated with sending or receiving test traffic (e.g., one or more data units, messages, packets) and/or for testing a SUT 114 (e.g., a network node, a network interface card (NIC), a switching application-specific integrated circuit (ASIC), a network processing unit (NPU), a network switch, a network of switches, etc.) or aspects thereof, e.g., an LA implementation executing on or at SUT 114. For example, test system 100 or related entities may generate and send test traffic to SUT 114, e.g., one or more network switches, smart NICs, remote direct memory access (RDMA) NICs, or a switching ASIC. In this example, test system 100 may send test traffic to SUT 114, receive test traffic, copies of test traffic, or test feedback information from SUT 114 and/or other entities, and analyze performance aspects of SUT 114 or an LA implementation associated with SUT 114.

SUT 114 may include any suitable entity or entities (e.g., devices, cards, chips, systems, platforms, or software executing on one or more processors) for receiving, processing, forwarding, and/or sending one or more messages (e.g., packets). For example, SUT 114 may include a network node, a network switch, a network router, a network interface card, a packet forwarding device, or a software based element. In some embodiments, SUT 114 or an element thereof may include processing logic (e.g., rules associated with packet forwarding/processing) for LA, e.g., load sharing or load balancing traffic among a plurality of links or paths.

In some embodiments, SUT 114 may include a container or software in a virtual container (VC) or a virtual machine (VM) executing on shared resources (e.g., compute, storage, and network resources). For example, SUT 114 may be a container or related application acting as a switch or packet forwarding device and may execute on one or more of nodes or physical devices in a cloud or distributed environment.

In some embodiments, SUT 114 may include a switching ASIC or other hardware that utilizes SAI for utilizing switching and/or routing logic, e.g., an LA implementation. For example, an SAI-based LA implementation may be different from other open-source or proprietary implementations and, as such, user 112 (e.g., a test operator) or other entity may benefit from testing the SAI-based LA implementation in real-world scenarios and also by comparing its performance to other LA implementations.

In some embodiments, test system 100 may be a stand-alone tool, a testing device, a testing platform, or software executing on at least one processor. In some embodiments, test system 100 may be a single node or may be distributed across multiple computing platforms or nodes.

In some embodiments, test system 100 may include one or more modules for performing various functions or operations. For example, test system 100 may include a server and client emulation module for emulating a node or device that communicates with SUT 114.

Test system 100 may include a test controller 102 and one or more test agent(s) 110. Test controller 102 may be any suitable entity or entities (e.g., software executing on a processor, an ASIC, a field programmable gate array (FPGA), or a combination of software, an ASIC, or an FPGA) for performing one or more aspects associated with test session configuration, SUT based LA implementation configuration, or test management. In some embodiments, test controller 102 may include logic or software executing on processor(s) 104 and may utilize data storage 106.

Test controller 102 may include one or more processor(s) 104 and a memory 105. Processor(s) 104 may represent or include a physical processor, a general purpose microprocessor, a single-core processor, a multi-core processor, a field-programmable gateway array (FPGA), and/or an application-specific integrated circuit (ASIC) for executing software and/or logic stored in memory 105. Memory 105 may represent one or more computer readable media (e.g., random access memory (RAM)) for storing data, logic, or other information.

Data storage 106 may be any suitable entity or entities (e.g., a storage device, a non-transitory computer readable medium, or a storage system) for maintaining or storing information related to testing SUT 114 and/or related metrics. In some embodiments, data storage 106 may include local storage as well as public or private remote repositories, e.g., GitHub. In some embodiments, data storage 106 may contain traffic models, test cases, test session data, test configuration information, configuration information for SUT 114, analytics, LA implementation APIs or data models, logic for parsing or deriving LA implementation parameters from APIs or specifications, logic for comparing LA implementations, and/or other information. In some embodiments, data storage 106 may be located at or accessible by test system 100, test controller 102, another node, or distributed across multiple platforms or devices.

Communications interface(s) 108 may represent any suitable entities (e.g., network interface cards (NICs), port modules, and/or other hardware or software) for receiving and sending communications via various communications protocols and/or data formats. For example, communications interface(s) 108 may include a user interface (UI), a graphical UI (GUI), and/or an application programming interface (API) for allowing user 112 or another entity to provide configuration information and/or interact with test system 100. In another example, communications interface(s) 108 may include APIs or other interfaces to communicate with SUT 114 and/or test system components, e.g., test agent(s) 110. In this example, communications interface(s) 108 may be usable for providing configuration information (e.g., instructions) for configuring entities, e.g., prior to or during testing.

In some embodiments, test system 100 or a related entity (e.g., test controller 102) may provide a user interface (e.g., communications interface(s) 108) for a user 112 (e.g., a test operator) and/or another entity to interact with test system 100 or provide configuration information or other input. In some embodiments, a user interface associated with test system 100 may support automation (e.g., via one or more scripting languages), a representation state transfer (REST) API, a command line, and/or a web-based GUI. For example, user 112 may be any entity (e.g., an automated system or a device or system controlled or controllable by a human user) for selecting and/or configuring various aspects associated with configuring and/or executing one or more tests or test sessions. In this example, user 112 may utilize a management application user interface (API) and/or a graphical user interface (GUI)) for providing test configuration information, such as a test session plan or definition, test traffic template information, performance metrics to be computed, environment settings, network topology, etc.

Test agent(s) 110 may be any suitable entity or entities (e.g., software executing on a processor, an ASIC, an FPGA, or a combination of software, an ASIC, or an FPGA) for performing one or more aspects associated with testing SUT 114, e.g., generating test traffic or executing test sessions, test cases, or test scenarios. In some embodiments, test agent(s) 110 may be standalone devices or platforms or may be deployed as software executing on other nodes or devices. In some embodiments, test agent(s) 110 may be configurable by test controller 102 or other test system entities. For example, test agent(s) 110 may receive configuration instructions (e.g., test traffic templates and/or related data) from test controller 102 or another source. In this example, test agent(s) 110 may use the instructions to generate test traffic associated with a test session or related scenario and may respond to traffic from SUT 114.

In some embodiments, test controller 102 may generate test session plan information (e.g., configuration instructions associated with a test session, test traffic profiles, feedback data to collect or derive, and reports or test performance information to generate) and may provision or provide the configuration instructions to various test system components, e.g., stand-alone or distributed test agent(s) 110. In this example, the configuration instructions may be communicated to various test system components via an external or internal communications channel or protocol.

In some embodiments, test system 100 or test controller 102 may also send instructions for configuring test agent(s) 110 and/or other test system components to provide test feedback information to test system 100 or a related entity. For example, configuration instructions may indicate what statistics, metrics, or metadata to collect about the test traffic, responses to the test traffic, or related routing and when or how to provide this information to test system 100 or a related entity.

In some embodiments, test system 100 or test controller 102 may send configuration instruction to SUT 114 or related entities. For example, when testing an LA implementation (e.g., an ECMP or LAG routing implementation) of SUT 114, test controller 102 may determine various LA implementation parameters (e.g., settings or aspects) that can be (re)configured and may send configuration information for changing parameters and related behaviors of the LA implementation. In this example, some test session plans may include causing an LA implementation under test to change its configuration (and related behavior) during testing for characterizing the performance of an LA implementation and/or different configurations thereof.

In some embodiments, test system 100 or test controller 102 may also send instructions for configuring SUT 114 to generate and provides copies of test traffic and/or to provide test feedback information (e.g., statistics, metrics, metadata) to test system 100 or a related entity. For example, configuration instructions may indicate what type of traffic is to be copied, what ports are supposed to copy the traffic, where the copied traffic is supposed to be forwarded or sent for transmission to test system 100, and/or metadata to include with the copied packets. In another example, configuration instructions may indicate what statistics, metrics, or metadata to collect about the LA implementation or related routing and when or how to provide this information to test system 100 or a related entity.

In some embodiments, test system 100, test controller 102, or another entity may include functionality for obtaining or determining configurable parameters (e.g., settings or aspects) of an LA implementation running or executing at SUT 114. For example, test system 100 or a related entity (e.g., test controller 102) may send a request message to SUT 114 requesting an API model or specification indicating configurable parameters (e.g., settings or aspects) of an LA implementation. In another example, test system 100 or a related entity (e.g., test controller 102) may send a plurality of exploratory messages to SUT 114 to build, learn, or derive an API model or specification or configurable parameters (e.g., settings or aspects) of an LA implementation. In another example, user 112 or another entity may provide API specification information (e.g., a plain-text or an XML document) that can be parsed or understood by test system 100 or a related entity (e.g., test controller 102). In another example, test system 100 or a related entity (e.g., test controller 102) may access or query a data store (e.g., in data storage 106 or external or remote data stores) comprising predetermined configurable parameters (e.g., LA implementation parameters) of various LA implementations, where the data store is indexed by one or more SUT identifiers (e.g., an equipment identifier, a version number, etc.). In this example, to obtain relevant LA implementation parameters, test system 100 or a related entity (e.g., test controller 102) may query the data store or access other data stores or repositories (e.g., GitHub) using SUT identifier(s) provided by user 112 or SUT 114.

In some embodiments, e.g., where various SAI API definitions are stored and accessible from GitHub, test system 100 or a related entity (e.g., test controller 102) may access or query various data stores or repositories to obtain predetermined configurable parameters (e.g., LA implementation parameters) of various LA implementations. For example, e.g., when test controller 102 is setting up or configuring a test session or a test session definition or plan, test controller 102 or another entity may determine that SUT 114 is a switch running a particular NOS (e.g., a particular SONiC version) and may determine that this particular NOS may support one or more SAI releases. In this example, test controller 102 or another entity may access GitHub for the relevant SAI API definitions and may generate appropriate tests based on this information.

In some embodiments, test system 100, test controller 102, or another entity may include functionality for processing an API specification or model to identify or determine which parameters are related to or relevant for testing an LA implementation. For example, test system 100 or a related entity (e.g., test controller 102) may include logic for processing or analyzing API function names, API calls, metadata (e.g., comments) and detecting or deriving effects or functionality for API functions or API calls. In this example, test system 100 or a related entity (e.g., test controller 102) may have knowledge about common LA implementation parameters, but may attempt to identify additional parameters, e.g., load balancing parameters, that are available for some LA implementations.

In some embodiments, LA implementation parameters may include a link selection algorithm mode or type (e.g., hash-based, round robin, random, pseudo-random, etc.), a cyclic redundancy check (CRC) format parameter, a CRC folding parameter, an error-correcting code format, a hash function parameter, a link selection algorithm parameter, a hash bucket size parameter, a queue length parameter, a link or path utilization parameter, a hash bucket parameter, a hash behavior parameter, a link selection behavior parameter, or a bit order parameter.

In some embodiments, e.g., after determining or cataloging configurable LA implementation parameters associated with SUT 114, test system 100, test controller 102, or another entity may include functionality for developing or generating SUT configurations (e.g., LA implementation configurations) for a test session. For example, a test session plan may involve multiple LA implementation configurations that exercise or utilize a full range of values or an appropriate amount of combinations for various configurable LA implementation parameters. For example, a test session plan may involve testing various supported LA algorithm (e.g., a link selection algorithm) modes, e.g., a CRC 16 hash mode, a CRC 32 hash mode, a round robin mode, a random mode, a pseudo-random mode, etc. In another example, a test session plan may involve testing various packet header fields (e.g., media access control (MAC) address, IP address, TOS, layer 4 or physical port number, etc.) or various combinations thereof as input for the LA algorithm (e.g., a hash algorithm). In another example, in addition to or in lieu of testing hash modes or different hash inputs, a test session plan may involve testing one or more LA implementation modifiers (e.g., link or path selection modifiers) that can affect link or path selection, e.g., a configurable bit shift amount in its LA algorithm or link selection algorithm, a CRC folding option, egress link utilization, queue length, etc.

In some embodiments, test system 100, test controller 102, or another entity may include functionality for developing or deriving test session plans or related test traffic profiles using obtained or derived configurable LA implementation parameters of an LA implementation associated with SUT 114. For example, after determining a set of LA implementation parameters to modify for a test session, test controller 102 or a related entity (e.g., a test session plan generator) may develop test traffic profile(s) designed for testing performance aspects of various configurations of an LA implementation associated with SUT 114. In this example, the test traffic profile(s) may be designed as part of a test session plan and may indicate random, pseudo-random, or predetermined values or sequences of values for various test traffic parameters (e.g., packet header parameters and/or payload content) in test traffic sent to SUT 114 for testing an LA implementation or configurations thereof. Continuing with this example, the test traffic profile(s) may be usable for achieving one or more test goals or objectives associated with a related test session plan.

In some embodiments, test system 100, test controller 102, or another entity may include functionality for initiating or executing a test session plan. For example, test controller 102 may send configuration information associated with a test session plan to SUT 114 and various other entities (e.g., test agent(s) 110) for testing certain LA implementation configurations using various test traffic and/or traffic patterns (e.g., configuration changes and traffic changes may occur one or more times during the test session). In this example, e.g., depending on test goals or objectives, various actions, including for example particular test analysis, may occur.

Example test related actions may include generating and providing test feedback information (e.g., statistics or metrics), copying test traffic or related data and/or sending the copied test traffic or related data to test system 100, or generating and providing traffic distribution data or other test related data (e.g., traffic byte counters, packet counters, drop counters, congestion indicators, latency measurements (e.g., when the platform supports via in-band telemetry or another telemetry technique).

In some embodiments, test system 100, test controller 102, or another entity (e.g., a test analyzer) may include functionality for analyzing test feedback information and provide test results or reports. For example, a test analyzer of test system 100 may receive test related data (e.g., test feedback information, counters, and/or metrics) may derive or compile easy to read or human-comprehensible reports. For example, assuming test system 100 has access to historical data about different LA implementations (e.g., from different platforms, different vendors; different hardware or software versions, different releases, etc.), test system 100 or a related entity (e.g., a test analyzer) may compare performance aspects (e.g., load balancing performance, load sharing performance, convergence time, resiliency to path or link changes, sensitivity to load, etc.) about a tested LA implementation and its configurations thereof to a plurality of other LA implementations and their configurations thereof. In this example, test system 100 or a related entity (e.g., a test analyzer) may generate visuals, graphs, and easy to understand metric, e.g., even distribution performance metric versus one or more hash inputs (e.g., header fields) and/or hash algorithm, a linearity metric, etc.

In some embodiments, a test session may include testing path consistency (or inconsistency) of LA implementation, e.g., whether, if at all, traffic flows between a same source and destination take different paths. For example, a test session may involve sending test traffic to SUT 114 multiple times, while test system 100 or a related entity cause one or more LA implementation parameters (e.g., changing hash inputs and/or a hash algorithm mode) to change prior to each time the test traffic is sent to SUT 114. In this example, test system 100 or another entity may analyze test feedback information for understanding path consistency of a given configuration of an LA implementation associated with SUT 114 and may provide performance metrics that can be compared with other configurations of the same LA implementation and/or different LA implementations.

In some embodiments, a test session may include testing an LA implementation's load balancing or load sharing performance. For example, a test session may involve sending a set of test traffic flows to SUT 114 multiple times. In this example, test system 100 or a related entity may monitor how ingress throughput gets distributed at egress by the LA implementation (e.g., by generating a metric representing load balance and/or load sharing performance). In some examples, prior to resending a set of test traffic flows, test system 100 or a related entity may cause the size of some the flows to increase at ingress and test system 100 may then observe if the distribution of flows at egress changes and, if so, to what extent. In some embodiments, such a test session may be executed for understanding load balancing performance of an LA implementation and a similar test session may be executed for understanding load sharing performance of an LA implementation.

In some embodiments, a test session may include testing an LA implementation's performance regarding incast or multicast scenarios. For example, the test session may involve sending test traffic flows from a "same source" to "one destination" via SUT 114, sending test traffic flows from "different sources but a same layer 4 source port number" to "one destination" via SUT 114, and sending test traffic flows from "different sources with different layer 4 source port numbers" to "one destination" via SUT 114. In this example, test system 100 may monitor how ingress throughput gets distributed at egress by the LA implementation (e.g., by generating a metric representing load balance and/or load sharing performance). In such embodiments, prior to sending a particular set of test traffic flows, test system 100 may observe if the distribution of flows at egress changes and, if so, to what extent. In some embodiments, a test session may involve the sets of traffic flows be resent multiple time, e.g., when testing multiple configurations of the LA implementation.

In some embodiments, a test session may include testing an LA implementation's resiliency (e.g., regarding changes to path or link availability). For example, a test session may involve sending a set of test traffic flows to SUT 114 multiple times, where one or more changes to the number of available paths or links occur during the testing. In this example, test system 100 or a related entity may monitor how ingress throughput gets distributed at egress by the LA implementation (e.g., by generating a metric representing load balance and/or load sharing performance). In some examples, as available paths or links decrease, test system 100 or a related entity may observe how quickly new links are utilized and to what extent. In some embodiments, a test session for testing resiliency may also measure or examine impact on packet reordering (e.g., when an existing flow to get reassigned to a different link) and may use different flow input sets (e.g., hash input data) and increase or decrease flow count during testing when measuring the impact of packet reordering across traffic flows.

In some embodiments, a test session may include testing an LA implementation's load or utilization sensitivity. For example, a test session may involve sending a set of test traffic flows to SUT 114 multiple times. In this example, test system 100 or a related entity may monitor how ingress throughput gets distributed at egress by the LA implementation (e.g., by generating a metric representing load balance and/or load sharing performance). In some examples, prior to resending a set of test traffic flows, test system 100 or a related entity may cause some of the flows' loads (e.g., number of packets) to increase at ingress and test system 100 may then observe if and when the distribution of flows at egress changes and may generate a metric or other information for indicating how sensitive the LA implementation or a configuration thereof is to load affecting distribution.

In some embodiments, a test session may include testing how different LA implementation parameters affect load sharing or load balancing characteristics for different test traffic patterns or content therein. For example, where an LA implementation for testing is an ECMP routing implementation, for each packet, the ECMP routing implementation may uses a hash function and hash inputs (e.g., an IP 5 tuple comprising packet header parameter values) to generate an output value and the output value may correspond to a hash bucket (e.g., a unique range of output values) indicating a particular link or path the packet is to take. In this example, the ECMP routing implementation may perform load sharing (but not load balancing) because each path may not get an equal share of the traffic since some traffic flows (e.g., related packets that are associated with a same link or path) may be high-bandwidth or more common than other traffic flows. In this example, the ECMP implementation routing may allow additional information (e.g., current link workloads or packet sizes as additional hash inputs or as link selection modifiers) for affecting which path or link is selected, thereby allowing a flow to potentially move to a different path over time. Continuing with this example, test system 100 or a related entity may adjust packet sizes and flow volumes for different test traffic flows during a test session while also modifying behaviors (e.g., link selection criteria) of the ECMP routing implementation during the test session, thereby testing the performance of the ECMP routing implementation in various configurations and conditions and effectively characterizing the effects or impacts that certain test traffic has on different configurations of the ECMP routing implementation.

It will be appreciated that FIG. 1 is for illustrative purposes and that various depicted entities, their locations, and/or their functions described above in relation to FIG. 1 may be changed, altered, added, or removed.

Figure 2:
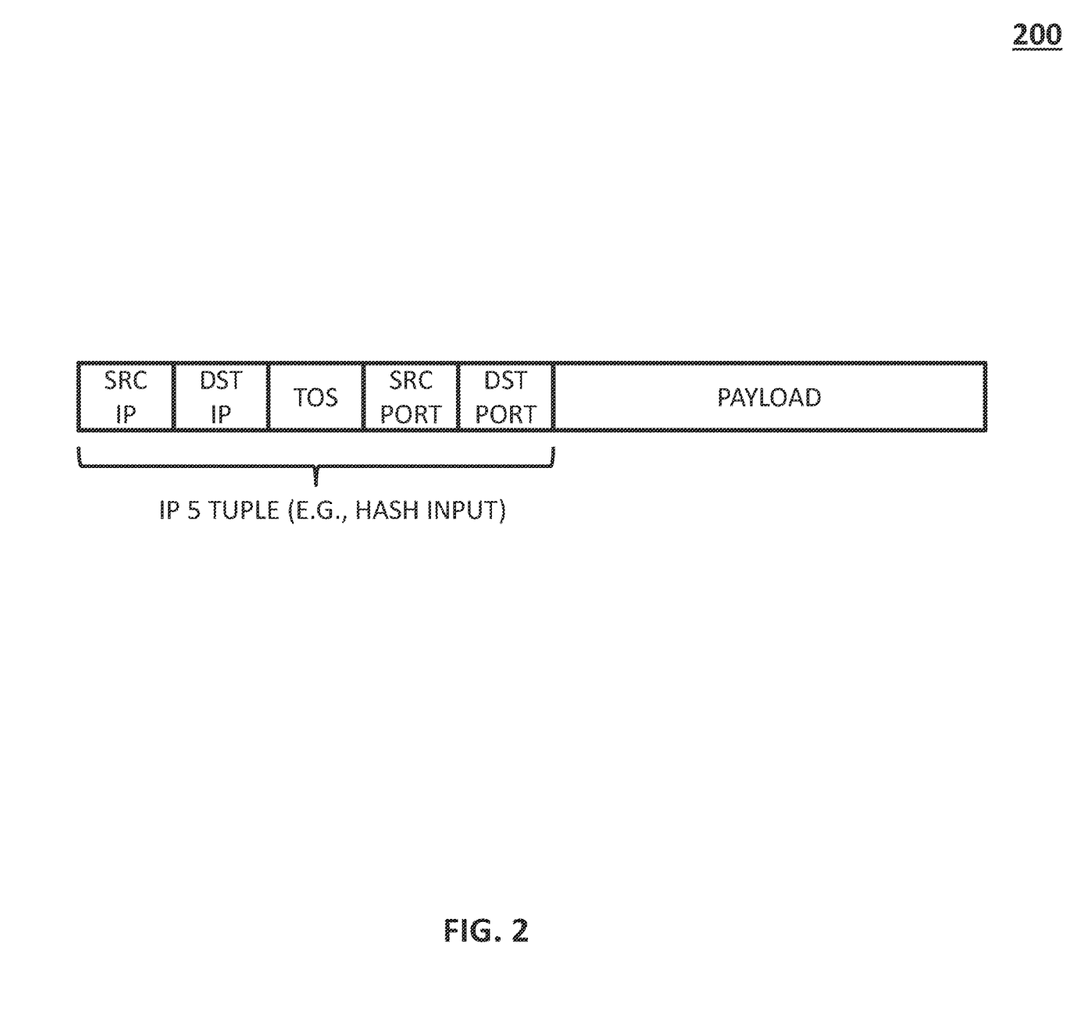
FIG. 2 is a block diagram illustrating an example Internet Protocol (IP) packet.

FIG. 2 is a block diagram illustrating an example internet protocol (IP) packet 200. As depicted in FIG. 2, packet 200 may include various packet header parameters (e.g., header fields) and a payload. Example packet header parameters may include a source IP address, a destination IP address, a type of service (TOS) (also referred to herein as a service type), a source port number, and/or a destination port number. In some embodiments, e.g., where an LA implementation using one parameter values as input into a hash algorithm or hash function, an IP five tuple (e.g., a source IP address, a destination IP address, a service type, a source port number, and a destination port number) may be usable as hash input.

In some embodiments, IP packet 200 may be encapsulated in an Ethernet frame or packet. In such embodiments, additional header parameters may also be usable by an LA implementation. For example, source and/or destination MAC addresses may be configurable inputs for a link selection algorithm (e.g., a hash function) of an LA implementation.

FIGS. 3A-3D is a block diagram illustrating an example LA implementation environment 300 in a scenario where available links or paths change. In some embodiments, LA implementation environment 300 may include or utilize SUT 114 or other entities (e.g., devices, components, or related functionality (e.g., software)) for performing an LA algorithm or a related routing or forwarding technique. In some embodiments, LA implementation environment 300 may include an LA algorithm 299 (e.g., an ECMP and/or LAG routing algorithm) for forwarding or routing packets. For example, algorithm 299 may include logic or software executing at or on SUT 114 or related entities, e.g., a network switch, a switching ASIC, a processor, etc.

In some embodiments, algorithm 299 or aspects thereof (e.g., hash inputs, hash function type, load awareness, traffic shaping or related affinity, etc.) may be configurable via a configuration API or other mechanism (e.g., by test controller 102). For example, after determining an API or model indicating configurable parameters (e.g., settings or aspects) of algorithm 299, test system 100 or a related entity may generate a test session plan and execute a test session for testing an LA implementation in different configurations.

In some embodiments, algorithm 299 or aspects thereof may be configured and tested regarding how it handles changes to path availability (e.g., how traffic flows are allocated or assigned when a link or path becomes unavailable and then available again).

In some embodiments, test system 100 or a related entity may include functionality for generating and executing a test session plan for measuring the behavior and resiliency of an LA implementation. For example, test controller 102 may configure a number of test agent(s) 110 to act as traffic generators for sending different traffic flows of various size or patterns, generate link failure in the topology, and measure how fast or slow the LA implementation can converge. For example, test system 100 or a related entity may cause or trigger path availability changes during a test session to measure performance of an LA implementation during such a scenario. In this example, when the number of available paths changes, algorithm 299 may rebalance the flows across the available paths, even for the flows whose current path is still active (e.g., available) and, as such, algorithm 299 (e.g., the path selection hashing algorithm) may select a different path (e.g., a different hash bucket) for the same flow. Continuing with this example, test system 100 or a related entity may receive test feedback information (e.g., from SUT 114 and/or test agent(s) 110) and may use this information in measuring performance and/or resiliency of the LA implementation.

Figure 3A:
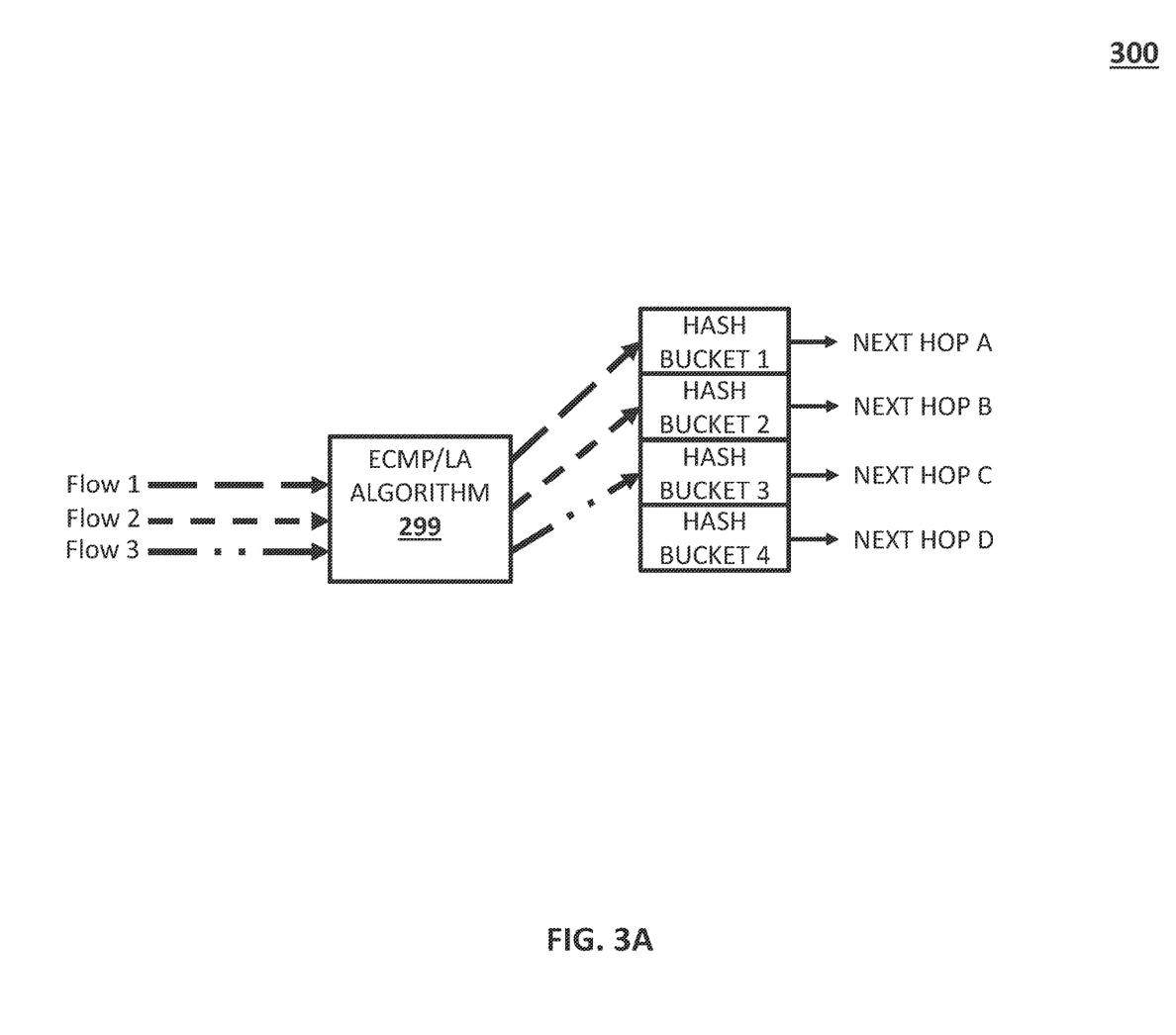
FIGS. 3A-3D depict an LA implementation environment in a scenario where available links or paths change.

Referring to FIGS. 3A-3D, algorithm 299 may represent an ECMP or LAG routing implementation that, for each packet, utilizes packet data as input and a hash algorithm to generate an output value that corresponds to a particular hash bucket and path. As depicted in FIG. 3A, algorithm 299 may process packets of three different flows (e.g., flows 1, 2, 3) using a hash algorithm. The output values may fall into one of four hash buckets (e.g., hash buckets 1, 2, 3, 4) and each hash bucket may correspond to one of four available paths (e.g., next hop A, B, C, D). In FIG. 3A, flow 1 is allocated or assigned to hash bucket 1 (next hop A); flow 2 is allocated or assigned to hash bucket 2 (next hop B); flow 3 is allocated or assigned to hash bucket 3 (next hop C); and no flows are assigned to hash bucket 4 (next hop D).

Figure 3B:
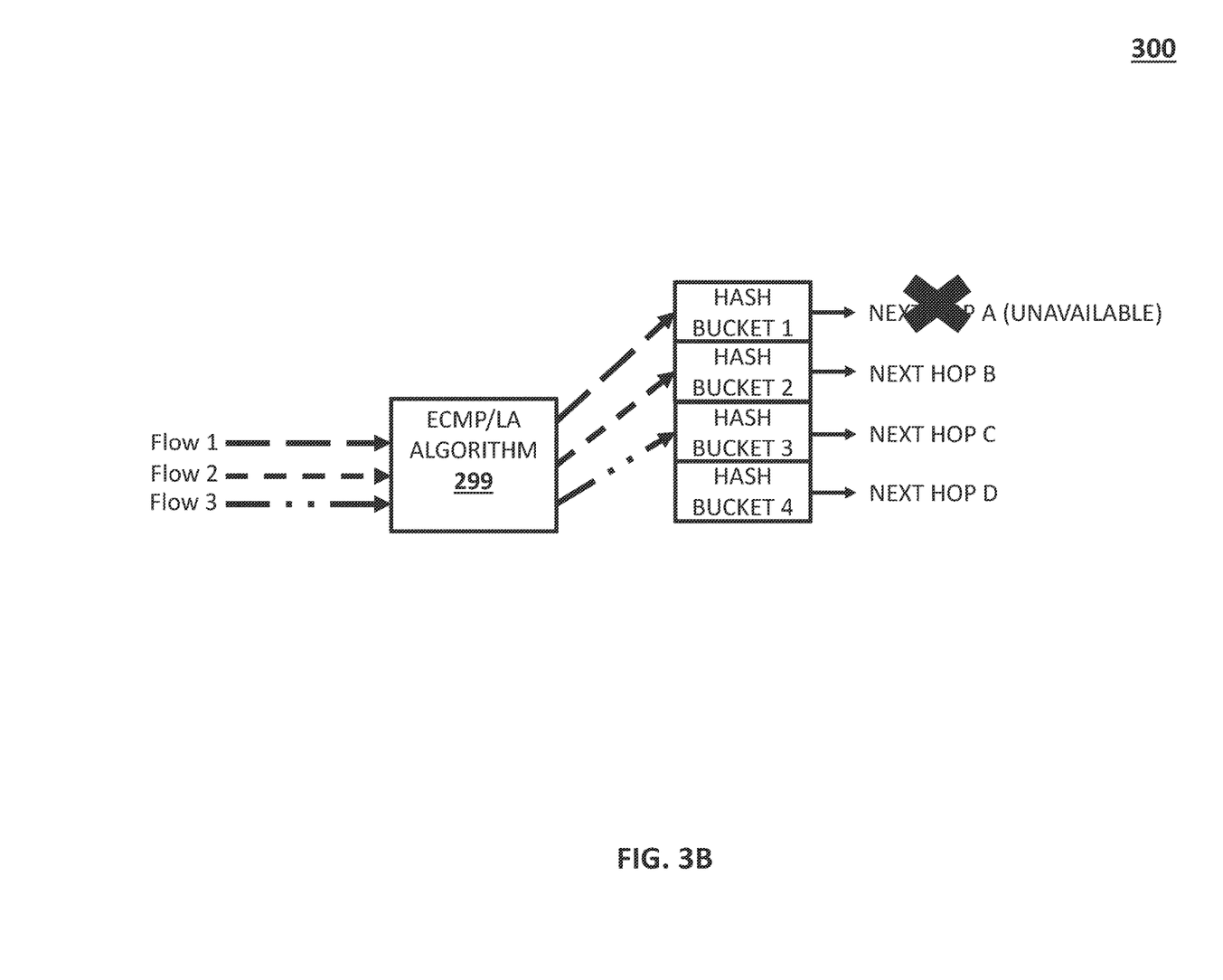

As depicted in FIG. 3B, next hop A (or a related link or path) may become unavailable and, in response, algorithm 299 may rebalance the flows, e.g., by changing the number of hash buckets and their corresponding paths. For example, after next hop A becomes unavailable, algorithm 299 may reduce the number of hash buckets from four to three, where hash bucket 1 now corresponds to next hop B (instead of next hop A); hash bucket 2 now corresponds to next hop C (instead of next hop B); and hash bucket 3 now corresponds to next hop D (instead of next hop C).

Figure 3C:
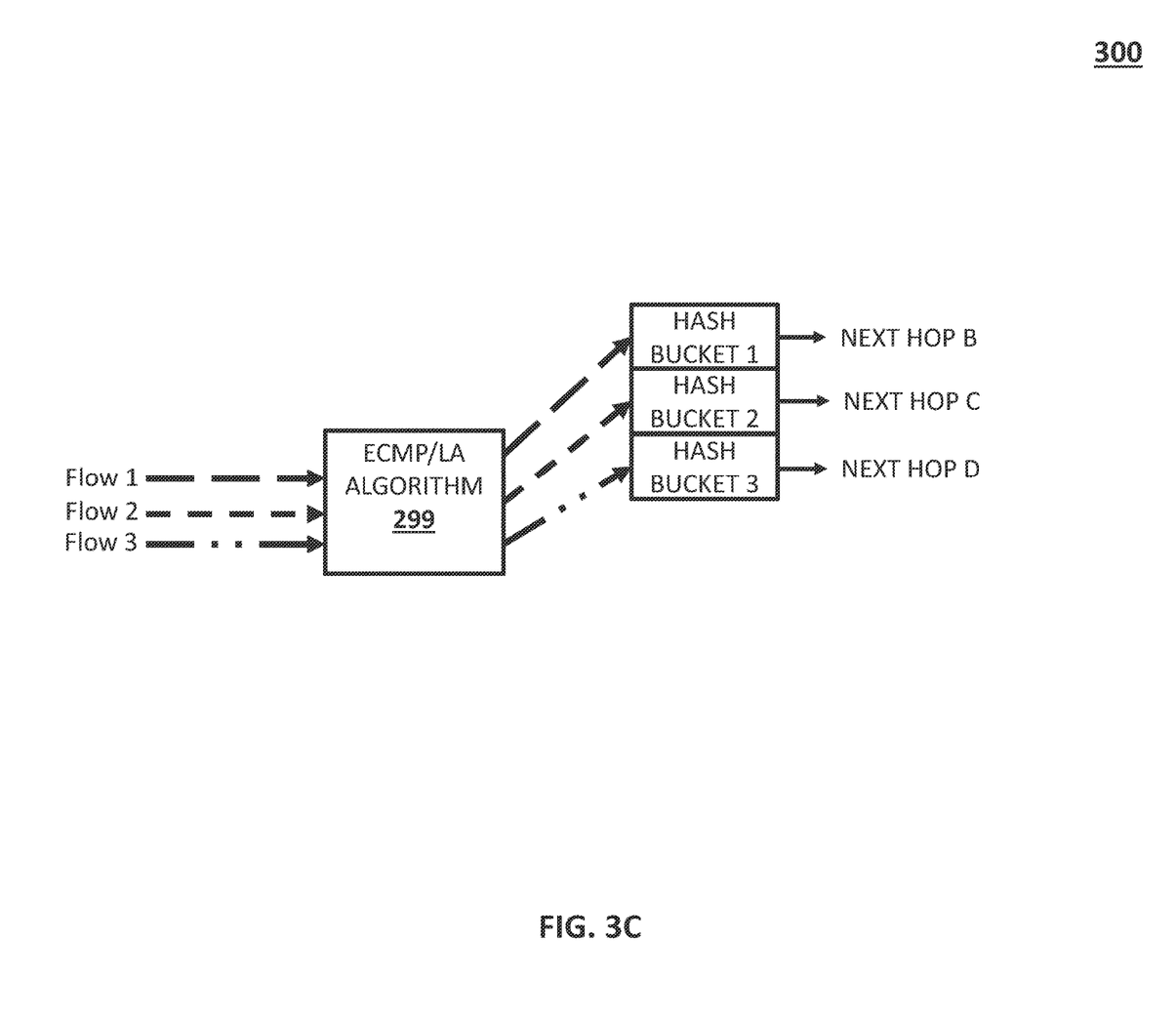

As depicted in FIG. 3C, after next hop A becoming unavailable and the subsequent rebalancing by algorithm 299, all three flows are reallocated or reassigned to different links or paths than before even though some of the links or paths remained active or available. In FIG. 3C, flow 1 is allocated or assigned to hash bucket 1 (next hop B); flow 2 is allocated or assigned to hash bucket 2 (next hop C); and flow 3 is allocated or assigned to hash bucket 3 (next hop D).

Figure 3D:
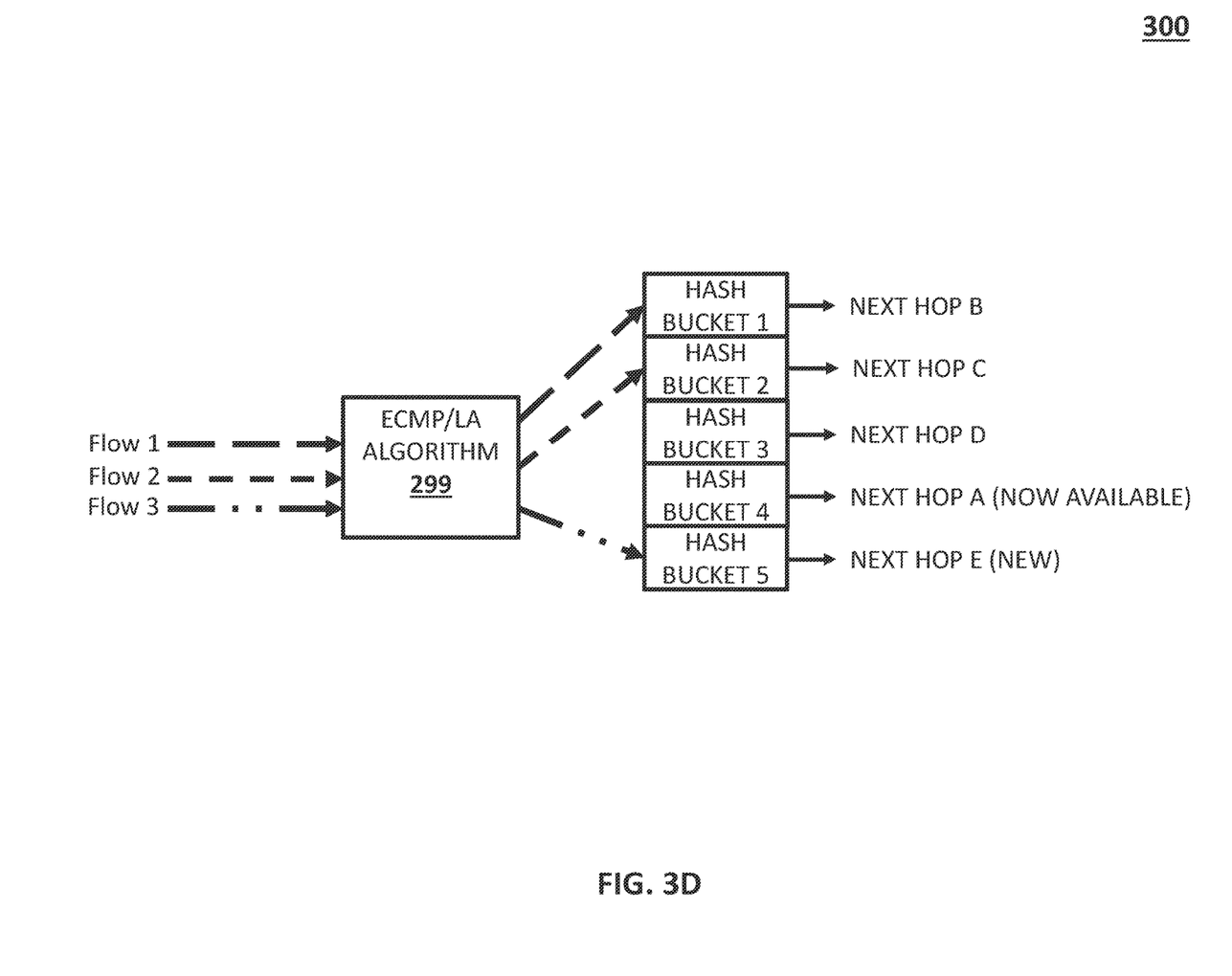

As depicted in FIG. 3D, additional rebalancing may occur in response to next hop A (or a related link or path) becoming available again and a new next hop E (or a related link or path) becoming active or available. For example, after next hop A and next hop E become available, algorithm 299 may increase the number of hash buckets from three to five, where hash bucket 1 corresponds to next hop B; hash bucket 2 corresponds to next hop C; hash bucket 3 corresponds to next hop D; hash bucket 4 corresponds to next hop A; and hash bucket 5 corresponds to next hop E. In this example, algorithm 299 does not restore or rebalance with regard to past or original hash bucket assignments; e.g., hash bucket 1 does not corresponds to next hop A; hash bucket 2 does not corresponds to next hop B; hash bucket 3 does not corresponds to next hop C; and hash bucket 4 does not corresponds to next hop D (like in FIG. 3A). In FIG. 3D, flow 1 is allocated or assigned to hash bucket 1 (next hop B); flow 2 is allocated or assigned to hash bucket 2 (next hop C); and flow 3 is allocated or assigned to hash bucket 5 (next hop E).

As depicted in FIGS. 3A-3D, a scenario where available links or paths change can present issues or challenges that LA implementations may handle differently. For example, in response to a change in path availability (e.g., the number of available paths are reduced or increased), various LA implementations may handle rebalancing or other actions differently in an effort to minimize traffic convergence time, reduce packet reordering, minimize packet retransmissions, or related packet drops. In another example, SUT vendors may create proprietary ECMP implementations, where performance and scalability of these ECMP implementations differ from vendor to vendor. Continuing with this example, the number of ECMP paths that are be handled in an efficient manner may vary between vendors. Depending on the implementation, some vendors may be able to handle removal of existing paths in an efficient or resilient manner (e.g., by recovering or adjusting quickly with minimal user experience disruption or network impact). Further, adding new paths to an existing set of active paths may trigger rebalancing of all the flows and some ECMP solutions may not be able to handle this in an efficient or resilient manner.

It will be appreciated that FIGS. 3A-3D are for illustrative purposes and that various depicted entities, their locations, and/or their functions described above in relation to FIGS. 3A-3D may be changed, altered, added, or removed. It will also be appreciated that various actions described above in relation to FIGS. 3A-3D may occur in a different order and/or some of the actions may occur concurrently.

Figure 4:
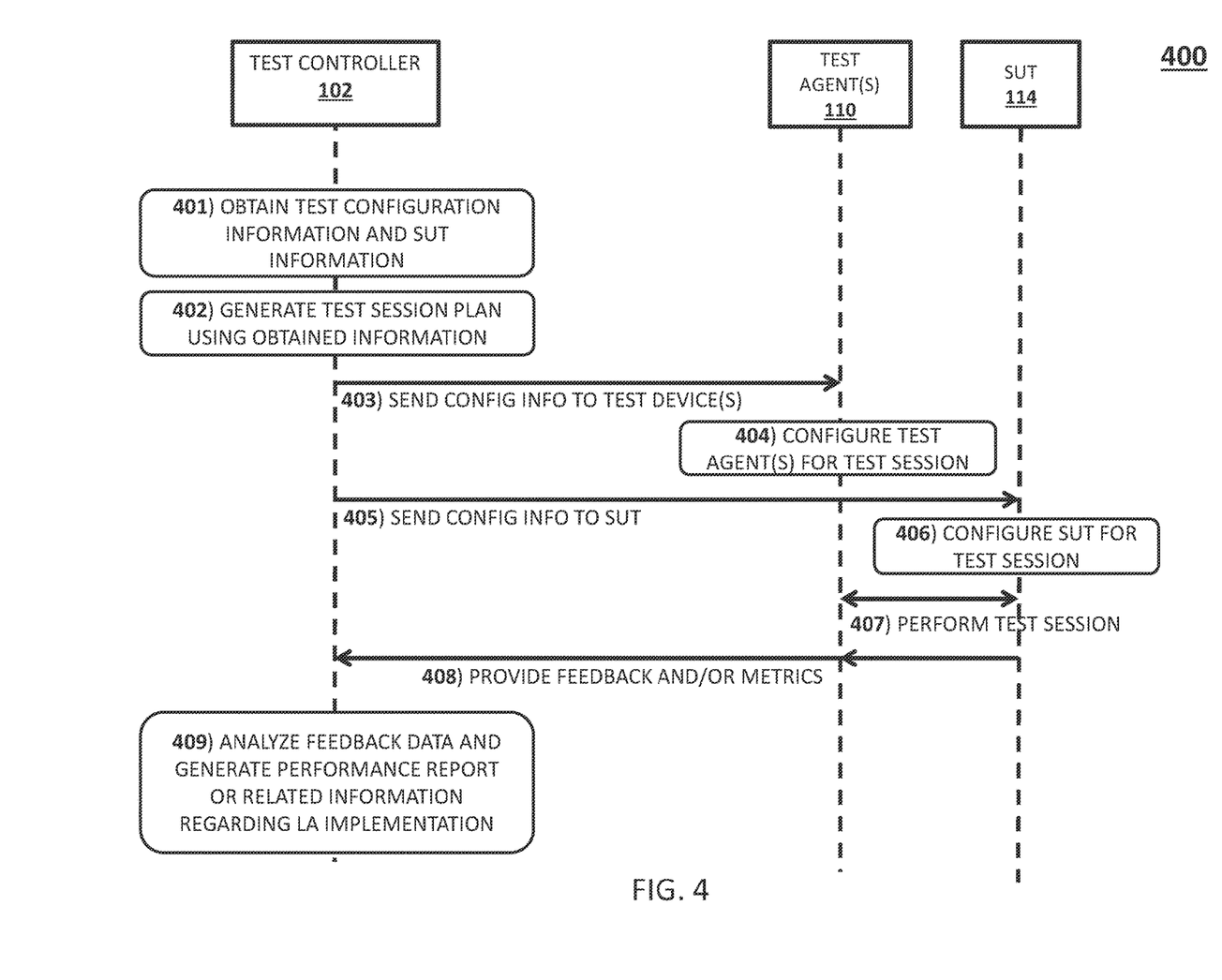
FIG. 4 depicts a message flow diagram illustrating a test controller configuring test agent(s) and a SUT.

FIG. 4 depicts a message flow diagram 400 illustrating test controller 102 configuring test agent(s) 110 and SUT 114. In some embodiments, a test operator (e.g., user 112) may select or provide configuration information for setting up a test session. For example, user 112 may indicate or provide (e.g., to test controller 102) information about test goals and/or information about SUT 114. In this example, test controller 102 may determine a test session plan including configuration information for causing test agent(s) 110 to send appropriate test traffic and for causing SUT 114 to configure or modify (e.g., select and/or change settings) an LA implementation (e.g., one or more times during the test session). Continuing with this example, test controller 102 may also configure test agent(s) 110 and/or SUT 114 to provide feedback information (e.g., copies of packets, traffic statistics, processing metadata, etc.) for test session analysis.

Referring to FIG. 4, in step 401, test controller 102 or a related entity may obtain test configuration information and SUT information. For example, test configuration information and/or SUT information may be provided by user 112 via communications interface(s) 108, e.g., a GUI, an API, or other interface.

In some embodiments, test controller 102 or a related entity may identify or determine configurable parameters (e.g., settings or aspects) of an LA implementation that can affect its performance, e.g., by querying SUT 114 for these parameters and/or by querying a data store containing configurable LA implementation parameters and associated SUT identifiers (e.g., equipment identifiers, model numbers, version numbers, or other identifiers). Example LA implementation parameters may include a hash algorithm mode or type, a CRC format parameter, a CRC folding parameter, an error-correcting code format, a hash function or algorithm parameter, a hash bucket size parameter, a queue length parameter, a link or path utilization parameter, a hash bucket parameter, a hash behavior parameter, a link selection behavior parameter, or a bit order parameter.

In some embodiments, test controller 102 or a related entity may identify or determine test traffic parameters (e.g., packet header fields or payload content) and may be usable for generating varied test traffic when testing an LA implementation or configurations thereof. For example, after determining a set of LA implementation parameters to modify for a test session, test controller 102 or a related entity (e.g., a test session plan generator) may develop test traffic profile(s) designed for testing performance aspects of various configurations of an LA implementation associated with SUT 114. In this example, a test traffic profile may be useable by a traffic generator to generate pseudo-random test packets with some common or similar attributes.

In step 402, a test session plan may be generated using the obtained information. For example, test controller 102 or a related entity may generate a test session plan for testing an ECMP or LAG routing implementation at SUT where at least one LA implementation parameter (e.g., different hash algorithm inputs) and at least one test traffic parameter (e.g., different IP addresses and/or port addresses for different traffic flows) are modified during testing.

In step 403, at least a first configuration message (e.g., a configuration API call, a REST API message, or other message) comprising configuration information for configuring test agent(s) 110 (e.g., a traffic generator or another device) for executing a test session or portions thereof. For example, test controller 102 or a related entity may send instructions for generating a particular mix of test traffic with various test values (e.g., from predetermined potential packet header parameter values indicated in a test session plan). In this example, test controller 102 or a related entity may also send instructions indicating when a test session should be executed and/or other how test agent(s) 110 should generate performance metrics or provide feedback information associated with testing SUT 114.

In step 404, each of test agent(s) 110 may configure itself using received configuration information (e.g., provided by test controller 102). In some embodiments, test agent(s) 110 may use configuration information to generate test traffic with various packet characteristics. In such embodiments, the packet characteristics may be for testing a particular aspect of an LA implementation of SUT 114, e.g., load balancing or load sharing effects for traffic flows.

In step 405, at least a second configuration message (e.g., a configuration API call, a REST API message, or other message) comprising configuration information for configuring an LA implementation at SUT 114, e.g., a NOS based switch, a SAI based switch, a switching ASIC, a NPU, etc. For example, test controller 102 or a related entity may send instructions for configuring settings or other aspects of an ECMP or LAG implementation at SUT 114. In this example, test controller 102 or a related entity may also send instructions indicating whether SUT 114 should generate performance metrics or provide feedback information associated with testing.

In step 406, SUT 114 may configure an LA implementation that executes thereon using received configuration information (e.g., provided by test controller 102). In some embodiments, SUT 114 may use configuration information to select an ECMP hash mode and to indicate the portions of a packet header used as inputs in the ECMP hash algorithm.

In step 407, a test session may be performed or initiated. For example, test controller 102 or another entity may send a trigger message for starting a test session or test agent(s) 110 may be previously configured to start the test session at predetermined time.

In step 408, one or more entities (e.g., test agent(s) 110, SUT 114, network taps, etc.) may provide test feedback information. For example, test agent(s) 110 may be configured to generate metrics or statistics associated with test traffic that traverses SUT 114 and may send this information or related data to test controller 102 or a related entity (e.g., a test analyzer). In another example, SUT 114 may send statistics, metadata, and/or copies of test packets to test controller 102 or a related entity (e.g., a test analyzer).

In step 409, test controller 102 or a related entity (e.g., a test analyzer) may receive and analyze test feedback information and generate a performance report or related information. For example, a test analyzer may obtain test feedback data from various entities and may generate performance reports or test analysis reports using the test feedback data.

It will be appreciated that FIG. 4 is for illustrative purposes and that various depicted messages and details for configuring test agent(s) 110 and SUT 114 described above in relation to FIG. 4 may be changed, altered, added, or removed.

Figure 5:
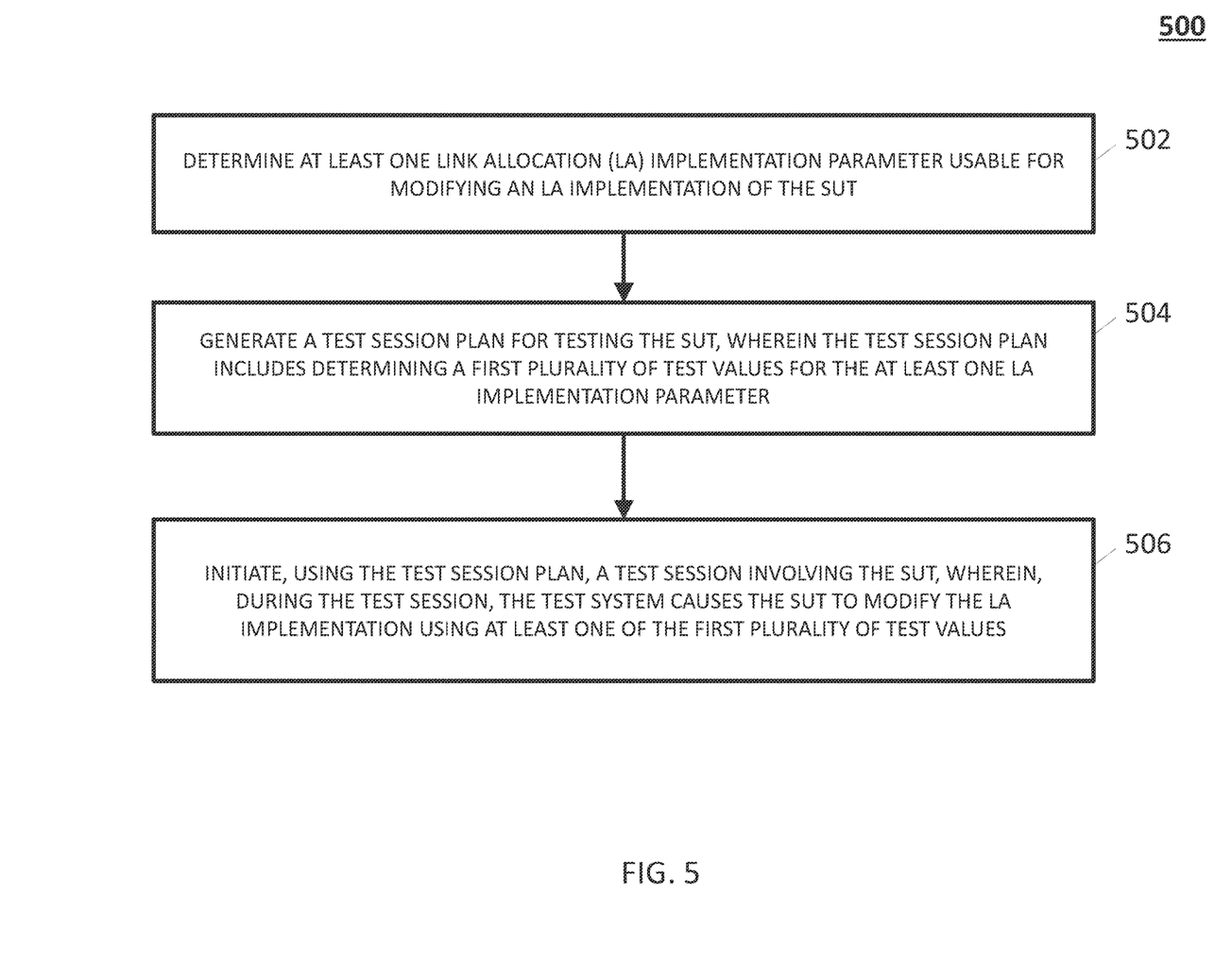
FIG. 5 is a flow chart illustrating an example process for testing an LA implementation.

FIG. 5 is a diagram illustrating an example process 500 for testing a LA implementation. In some embodiments, process 500, or portions thereof, may be performed by or at test system 100, test controller 102, and/or another node or module. In some embodiments, process 500 may include steps 502, 504, 506, and/or 508.

In some embodiments, process 500 or portions thereof may occur at test system 100. For example, test controller 102 may generate a test session plan and related configuration information (e.g., API calls, configuration messages, instructions, etc.) for configuring test agent(s) 110 and SUT 114. In this example, test controller 102 may also configure test agent(s) 110 for generating appropriate test traffic during the test session and/or trigger the test session.

Referring to process 500, in step 502, at least one link allocation (LA) implementation parameter usable for modifying an LA implementation of a SUT (e.g., an ECMP or LAG routing implementation executing on SUT 114) may be obtained. For example, user 112 may provide (e.g., to test system 100 or test controller 102) some test related information (e.g., by selecting a predefined test session for a particular type or version of SUT 114 or entity thereof).

In another example, user 112 may provide information about test goals and/or information about SUT 114 (e.g., an IP address, connection details, a network switch's product number, an equipment number, a switching ASIC version, etc.). In this example, test system 100 or test controller 102 may use the provided information to query data storage 106 or SUT 114 itself for a configuration API, an LA implementation configuration model, or information indicating configurable parameters (e.g., settings or aspects) of an LA implementation. Continuing with this example, test system 100 or test controller 102 (with or without user interaction/input) may use this additional LA implementation information in generating a test session plan for testing one or more aspects of an LA implementation (e.g., an ECMP or LAG routing logic) provided or executed by SUT 114.

In some embodiments, determining at least one LA implementation parameter may include accessing and analyzing a configuration API specification or model associated with SUT 114, wherein accessing and analyzing the API specification or model may include obtaining API specification or model information from SUT 114 or from a data storage accessible by test system 100.

In some embodiments, at least one LA implementation parameter may include a link selection algorithm mode or type (e.g., hash-based, round robin etc.), a CRC format parameter, a CRC folding parameter, an error-correcting code format, a hash function parameter, a link selection algorithm parameter, a hash bucket size parameter, a queue length parameter, a link or path utilization parameter, a hash bucket parameter, a hash behavior parameter, a link selection behavior parameter, or a bit order parameter.

In step 504, a test session plan for testing the SUT may be generated, where generating the test session plan may include determining a first plurality of test values for the at least one LA implementation parameter. For example, test system 100 or test controller 102 may determine that the packet header parameters inputted in a hash function used by an LA implementation of SUT 114 can be (re)configured.

In some embodiments, generating a test session plan may include generating a second plurality of test values for at least one test traffic parameter (e.g., a MAC address, an IP address, a service type, a flow identifier, a packet header parameter value, a packet flow amount, a port number) usable for testing an LA implementation of a SUT. For example, test system 100 or test controller 102 may generate or determine different combinations of packet parameters to use for hashing, e.g., source IP and source port; source IP, source port, and destination IP; destination IP and destination port; destination IP, destination port, source IP, and source port; and destination IP, destination port, source IP, source port, and transport protocol. Continuing with this example, test system 100 or test controller 102 may select or determine a range of IP addresses, port numbers, and/or transport protocols usable for test traffic to test the hash function input aspect of the LA implementation of SUT 114.

In some embodiments, a test session plan (e.g., generated by test system 100 or test controller 102) may trigger SUT 114 or another entity to modify aspects (e.g., hash functions used or hash input parameters) of an ECMP routing implementation or an link aggregation group implementation, while also including instructions (e.g., to test agent(s) 110 or traffic generators) for modifying appropriate test traffic attributes or content.

In step 506, a test session involving the SUT may be initiated. In some embodiments, during the test session, the test system may cause the SUT to modify the LA implementation using at least one of the first plurality of test values (e.g., from hash function A to hash function B or from a 5 IP tuple to source IP address and source port tuple). For example, in response to a trigger instruction or related instructions from test controller 102 or another entity, test agent(s) 110 may start a test session by sending test traffic flows to SUT 114. In this example, test system 100 or another entity (e.g., test controller 102) may also send commands or instructions to SUT 114 for modifying an LA implementation executing at SUT 114 (e.g., by changing aspects of a hashing algorithm like algorithm 299) during the test session. In some embodiments, during a test session, test traffic content and/or related packet volumes may change during the test session depending on performance aspects or configurations being tested.

In some embodiments, test system 100 or another entity may be configured for analyzing, using test feedback information, performance of an LA implementation (e.g., at SUT 114); and reporting, to a test operator (e.g., user 112), test results including at least one LA performance metric associated with the LA implementation.

In some embodiments, analyzing performance of an LA implementation (e.g., at SUT 114) may include receiving or monitoring a portion of SUT-traversed test traffic and analyzing the portion of SUT-traversed test traffic. For example, SUT 114 or a network tap may be configured to mirror or send test packets to test system 100 or another entity (e.g., test agent(s) 110 or a test analyzer).

In some embodiments, at least one LA performance metric may include an LA resiliency performance metric, a many to one in-cast LA efficiency performance metric, an LA load balancing versus load sharing performance metric, an LA packet reordering performance metric, or an LA implementation comparison metric.

In some embodiments, reporting test results may include reporting LA performance metrics for a plurality of different systems including SUT 114 or test traffic distribution information for a plurality of links.

In some embodiments, an LA implementation may include an ECMP implementation, a LAG implementation, a multi-path routing implementation, or a proprietary LA implementation.

In some embodiments, a SUT (e.g., SUT 114) may include an ASIC, a NIC, a network switch, a network router, or a packet forwarding device.

It will be appreciated that process 500 may be for illustrative purposes and that different and/or additional actions may be used. It will also be appreciated that various actions described herein may occur in a different order or sequence. Further, it will be appreciated that process 500 or aspects described herein may be useful for testing various algorithms, especially those that have configurable parameters that can be adjusted or modified by a test system 100 or another entity, e.g., during testing.

It should be noted that test system 100, test controller 102, test agent(s) 110, and/or functionality described herein may constitute a special purpose computing device. Further, test system 100, test controller 102, test agent(s) 110, and/or functionality described herein can improve the technological field of testing SUTs or LA implementations (e.g., an ECMP or LAG routing technique) thereof. Furthermore, test system 100, test controller 102, test agent(s) 110, and/or functionality described herein can improve testing involving LA implementations at SUT 114 by utilizing a configuration API or another mechanism or technique to cause SUT 114 to modify its LA implementation during a test session. For example, by utilizing test system 100 that can (re)configure parameters of an LA implementation at SUT 114, a test operator (e.g., user 112) can test and analyze the LA implementation in different configurations (e.g., operating setting or parameter values) and can compare these performances to other LA implementations, e.g., using historical or predetermined data.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for testing a link allocation (LA) implementation,
the method comprising:
at a test system for testing a system under test (SUT):
determining at least one link allocation (LA) implementation parameter usable for modifying an LA implementation of the SUT;
generating a test session plan for testing the SUT, wherein generating the test session plan includes determining a first plurality of test values for the at least one LA implementation parameter, wherein the at least one LA implementation parameter includes an equal-cost multi-path (ECMP) mode or ECMP algorithm parameter and wherein the first plurality of test values includes a first test value indicating a first ECMP mode or ECMP algorithm supported by the SUT but not initially utilized by the SUT; and
initiating, using the test session plan, a test session involving the SUT, wherein, during the test session, the test system causes the SUT to modify the LA implementation using at least one of the first plurality of test values, wherein the SUT modifies the LA implementation to utilize the first ECMP mode or ECMP algorithm during the test session.

2. The method of claim 1 comprising:
analyzing, using test feedback information, performance of the LA implementation; and
reporting, to a test operator, test results including at least one LA performance metric associated with the LA implementation.

3. The method of claim 2 wherein analyzing the performance of the LA implementation includes receiving or monitoring a portion of SUT-traversed test traffic and analyzing the portion of SUT-traversed test traffic.

4. The method of claim 2 wherein the at least one LA performance metric includes an LA resiliency performance metric, a many to one in-cast LA efficiency performance metric, an LA load balancing versus load sharing performance metric, an LA packet reordering performance metric, or an LA implementation comparison metric.

5. The method of claim 2 wherein reporting the test results include reporting LA performance metrics for a plurality of different systems including the SUT or test traffic distribution information for a plurality of links.

6. The method of claim 1 wherein determining the at least one LA implementation parameter accessing and analyzing a configuration application programming interface (API) specification or model associated with the SUT, wherein accessing and analyzing the API specification or model includes obtaining API specification or model information from the SUT or from a data storage accessible by the test system.

7. The method of claim 1 wherein the at least one LA implementation parameter includes a link selection algorithm mode or type, a cyclic redundancy check (CRC) format parameter, a CRC folding parameter, an error-correcting code format, a hash function parameter, a link selection algorithm parameter, a hash bucket size parameter, a queue length parameter, a link or path utilization parameter, a hash bucket parameter, a hash behavior parameter, a link selection behavior parameter, or a bit order parameter.

8. The method of claim 1 wherein generating the test session plan includes determining a second plurality of test values for at least one test traffic parameter, where the at least one test traffic parameter includes a media access control (MAC) address, an internet protocol (IP) address, a service type, a flow identifier, a packet header parameter value, a packet flow amount, or a port number.

9. The method of claim 1 wherein the ECMP mode or ECMP algorithm parameter includes a cyclic redundancy check (CRC) 16 hash mode, a CRC 32 hash mode, a round robin mode, a random mode, or a pseudo-random mode; or
wherein the SUT includes a switching application-specific integrated circuit (ASIC), a network interface card (NIC), a network switch, a network router, or a packet forwarding device.

10. A system for testing a link allocation (LA) implementation, the system comprising:
at least one processor;
a memory; and
a test system for testing a system under test (SUT), wherein the test system is implemented using the at least one processor and the memory, the test system configured for:
determining at least one link allocation (LA) implementation parameter usable for modifying an LA implementation of the SUT;
generating a test session plan for testing the SUT, wherein generating the test session plan includes determining a first plurality of test values for the at least one LA implementation parameter, wherein the at least one LA implementation parameter includes an equal-cost multi-path (ECMP) mode or ECMP algorithm parameter and wherein the first plurality of test values includes a first test value indicating a first ECMP mode or ECMP algorithm supported by the SUT but not initially utilized by the SUT; and initiating, using the test session plan, a test session involving the SUT, wherein, during the test session, the test system causes the SUT to modify the LA implementation using at least one of the first plurality of test values, wherein the SUT modifies the LA implementation to utilize the first ECMP mode or ECMP algorithm during the test session.

11. The system of claim 10 wherein the test system is configured for:
analyzing, using test feedback information, performance of the LA implementation; and
reporting, to a test operator, test results including at least one LA performance metric associated with the LA implementation.

12. The system of claim 11 wherein the test system is configured for receiving or monitoring a portion of SUT-traversed test traffic and analyzing the portion of SUT-traversed test traffic.

13. The system of claim 11 wherein the at least one LA performance metric includes an LA resiliency performance metric, a many to one in-cast LA efficiency performance metric, an LA load balancing versus load sharing performance metric, an LA packet reordering performance metric, or an LA implementation comparison metric.

14. The system of claim 11 wherein the test system is configured for reporting LA performance metrics for a plurality of different systems including the SUT or test traffic distribution information for a plurality of links.

15. The system of claim 10 wherein the test system is configured for accessing and analyzing a configuration application programming interface (API) specification or model associated with the SUT, wherein accessing and analyzing the API specification or model includes obtaining API specification or model information from the SUT or from a data storage accessible by the test system.

16. The system of claim 10 wherein the at least one LA implementation parameter includes a link selection algorithm mode or type, a cyclic redundancy check (CRC) format parameter, a CRC folding parameter, an error-correcting code format, a hash function parameter, a link selection algorithm parameter, a hash bucket size parameter, a queue length parameter, a link or path utilization parameter, a hash bucket parameter, a hash behavior parameter, a link selection behavior parameter, or a bit order parameter.

17. The system of claim 10 wherein generating the test session plan includes determining a second plurality of test values for at least one test traffic parameter, where the at least one test traffic parameter includes a media access control (MAC) address, an internet protocol (IP) address, a service type, a flow identifier, a packet header parameter value, a packet flow amount, or a port number.

18. The system of claim 10 wherein the ECMP mode or ECMP algorithm parameter includes a cyclic redundancy check (CRC) 16 hash mode, a CRC 32 hash mode, a round robin mode, a random mode, or a pseudo-random mode.

19. The system of claim 10 wherein the SUT includes a switching application-specific integrated circuit (ASIC), a network interface card (NIC), a network switch, a network router, or a packet forwarding device.

20. A non-transitory computer readable medium having stored thereon executable instructions embodied in the non-transitory computer readable medium that when executed by at least one processor of a computer cause the computer to perform steps comprising:
at a test system for testing a system under test (SUT):
determining at least one link allocation (LA) implementation parameter usable for modifying an LA implementation of the SUT;
generating a test session plan for testing the SUT, wherein generating the test session plan includes determining a first plurality of test values for the at least one LA implementation parameter, wherein the at least one LA implementation parameter includes an equal-cost multi-path (ECMP) mode or ECMP algorithm parameter and wherein the first plurality of test values includes a first test value indicating a first ECMP mode or ECMP algorithm supported by the SUT but not initially utilized by the SUT; and
initiating, using the test session plan, a test session involving the SUT, wherein, during the test session, the test system causes the SUT to modify the LA implementation using at least one of the first plurality of test values, wherein the SUT modifies the LA implementation to utilize the first ECMP mode or ECMP algorithm during the test session.

* * * * *